(12) United States Patent
Ferlin

(10) Patent No.: US 6,910,513 B2
(45) Date of Patent: Jun. 28, 2005

(54) REDUCED MASS RADIAL TIRE BEAD

(75) Inventor: Oliver Ferlin, Malauzat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 260 days.

(21) Appl. No.: 10/279,509

(22) Filed: Oct. 24, 2002

(65) Prior Publication Data

US 2003/0075254 A1 Apr. 24, 2003

Related U.S. Application Data

(63) Continuation of application No. PCT/EP01/04427, filed on Apr. 19, 2001.

(30) Foreign Application Priority Data

Apr. 25, 2000 (FR) .............................................. 00 05343

(51) Int. Cl.$^7$ ........................... B60C 15/00; B60C 15/06
(52) U.S. Cl. ...................... 152/539; 152/541; 152/543; 152/547
(58) Field of Search ................................ 152/639, 541, 152/542, 543, 547, 555

(56) References Cited

U.S. PATENT DOCUMENTS 4,120,338 A  * 10/1978  Mirtain ........................ 152/541
4,953,605 A  *  9/1990  Kawamura et al. .......... 152/541

FOREIGN PATENT DOCUMENTS

| FR | 2406530 | * | 6/1979 |
| JP | 60-92103 | * | 5/1985 |
| JP | 03042310 | * | 2/1991 |
| JP | 3-248903 | * | 11/1991 |
| JP | 5-139125 | * | 6/1993 |
| JP | 10211806 | * | 8/1998 |
| LU | 87296 | * | 2/1989 |

* cited by examiner

Primary Examiner—Jeff H. Aftergut
Assistant Examiner—Justin Fischer
(74) Attorney, Agent, or Firm—Burns, Doane, Swecker & Mathis, LLP

(57) ABSTRACT

A tire P, which is intended to be mounted on a rim, the seats of which form an angle with the axis of rotation of between 0° and 6°, and comprises a radial carcass reinforcement (1) anchored within each bead B to a bead wire (2) so forming an upturn (10), said bead wire (2) being radially surmounted, axially between the main portion of the reinforcement (1) and its upturn (10), by at least one rubber mix profile (3) substantially triangular in form and of an elevated Shore A hardness, wherein the meridian profile of the axially outer surface of each bead B, exhibiting an abrupt discontinuity of curvature, is combined with the presence above the bead wire of a rubber mix profile (3) of elevated hardness, said profile (3) being axially in contact over its entire height with the upturn (10) of the carcass reinforcement (1) and separated from the main portion of said reinforcement (1) by a low hardness rubber mix profile (4), while a third profile (5), axially to the outside of the upturn (10), consists of a mix of low hardness.

3 Claims, 1 Drawing Sheet

REDUCED MASS RADIAL TIRE BEAD

CROSS-REFERENCE TO RELATED APPLICATIONS

This application is a continuation of international application Serial No. PCT/EP01/04427, filed Apr. 19, 2001 and published as WO 01/81103 in French on Nov. 1, 2001, which further claims priority to French application Serial No. FR 00/05343, filed Apr. 25, 2000.

BACKGROUND OF THE INVENTION

The present invention relates to a tire with radial carcass reinforcement for heavy vehicles, such as trucks and buses. More particularly, it relates to the beads of radial carcass tires, the seats of which are inclined relative to the axis of rotation at an angle $\alpha$, where $0° \leq \alpha \leq 6°$.

Rims of the "heavy-vehicle" type exhibit the peculiarity of having relatively high rim flanges according to the standards in force (TRA, ETRTO, JATMA), and the tires which use such rims are generally tires mounted with an inner tube accompanied by a flap disposed between the inner walls of the two tire beads.

Each bead comprises a bead wire, generally of the "braided" type, around which is anchored by winding a radial carcass reinforcement of metal reinforcement elements. The radial carcass reinforcement has a main, or non-upturned region, and an upturned region. The height of the upturned region, measured relative to the base of the bead, is greater than the height of the rim flange. The upturn is reinforced axially to the outside by an additional reinforcement armature, which may be made of metal or other elements, oriented relative to the circumferential direction at a slight angle, which may be between 5° and 30°. The additional reinforcement armature is wound around the anchoring bead wire and forms two strands: an axially outer stand the end of which is situated radially slightly above the end of the carcass reinforcement upturn and an axially inner strand, the end of which is generally situated below a straight line parallel to the axis of rotation and passing through the crown of the rim flange.

The main purpose of the additional reinforcement armature is to minimize the movement, in the three dimensions, of the radial carcass reinforcement upturn end and the protective layer of rubber mix. A protective layer of rubber mix, also known as a protector, surrounds the surface of the bead, which has to be in contact with the operating rim.

The additional reinforcement armature formed of metal elements or other elements is costly, and much research has been carried out with a view to dispensing with the additional reinforcement armature without thereby affecting the fundamental properties of the tire bead, i.e. ensuring that said tire remains on its operating rim whatever the driving conditions and for the longest possible period, which requires that any solution exhibit excellent properties with regard to endurance and resistance to rim wear.

One solution to the problem of resistance to rim flange wear, resulting from repeated flexure of the tire and movement between beads and rim flanges, is described in patent FR 2,406,530 which provides, for the outer surface of the bead, a suitable meridian profile. The profile consists of a first curved portion, which has to come into and remain in permanent contact with the surface of the rim flange. The first curved portion has at its junction with a second curved portion, an abrupt discontinuity of curvature. The meridian profile of the second curved portion is such that it cannot come into contact with the surface of the rim flange. The discontinuity between two curves may be defined geometrically as being the acute angle, viewed in meridian section, formed by the tangents to the two curves respectively at the junction point. The discontinuity is abrupt if the angle is at least equal to 35°. However, this solution has proven insufficient to compensate for the lack of wear resistance exhibited by the bead, which lack is caused by the absence of an additional bead reinforcement armature.

The object of the present invention is to provide a tire that omits the additional bead reinforcement, armature, while still having suitable bead endurance and resistance to rim wear.

SUMMARY OF THE INVENTION

According to the invention, a tire which is intended to be mounted on a rim, the seats of which form an angle with the axis of rotation of between 0° and 6°, comprising at least a first bead and further comprising a radial carcass reinforcement anchored within each bead to a bead wire so forming an upturn, the bead wire being radially surmounted, axially between the main portion of the reinforcement and its upturn, by at least one of a first rubber mix profile, which is substantially triangular in form and has an elevated Shore A hardness. The tire is further characterized in that the meridian profile of the axially outer surface of each bead, composed of a first curved portion intended to enter into and remain in permanent contact with the bead flange and exhibiting with a second curved portion an abrupt discontinuity of curvature, is combined with the presence of the first rubber mix profile (3) of the height HL, radially above the bead wire and axially between the main portion of the carcass reinforcement and its upturn, in such a way that the first rubber mix profile is axially in contact over its entire height with the carcass reinforcement upturn and is separated from the main portion of the reinforcement by a second rubber mix profile (4) having a low Shore A hardness. A third rubber mix profile (5), having a low Shore A hardness, is disposed axially to the outside of the carcass reinforcement upturn between the protector (6) which covers the bead B axially to the outside, and the upturn.

A rubber mix of elevated Shore A hardness is understood to mean a mix whose hardness is at least equal to 85 points.

A rubber mix of low Shore A hardness is understood to mean a mix whose hardness is at most equal to 60 points.

Traditionally, the upper end of the rubber profile radially above the bead wire is attached to the main portion of the carcass reinforcement so that the profile is virtually not in contact with the upturn of the radial carcass reinforcement. The present invention inverts this positioning so that the upper end of the first rubber profile mix is attached to the upturn. This inverted positioning of the profile of the first rubber mix profile having an elevated Shore A hardness, in combination with the meridian profile of the outer surface of the bead, allows the conventional additional reinforcement armature to be omitted. This enables cost price to be reduced without the tire losing bead endurance and wear resistance.

In a further embodiment, the wear resistance of the bead protector and the endurance of the bead may advantageously be improved by the presence of a third rubber mix profile having a low Shore A hardness that is lower than the hardnesses of the rubber mix profiles between carcass reinforcement and upturn, and is at most equal to 55 points.

BRIEF DESCRIPTION OF THE DRAWING

The invention will be better understood with reference to the drawing appended as FIG. 1, which illustrates a nonlimiting example of an embodiment of a tire according to the invention. In this drawing, the FIGURE shows a schematic diagram of one embodiment of a tire bead according to the invention.

DETAILED DESCRIPTION OF THE PREFERRED EMBODIMENTS

Figure 1:
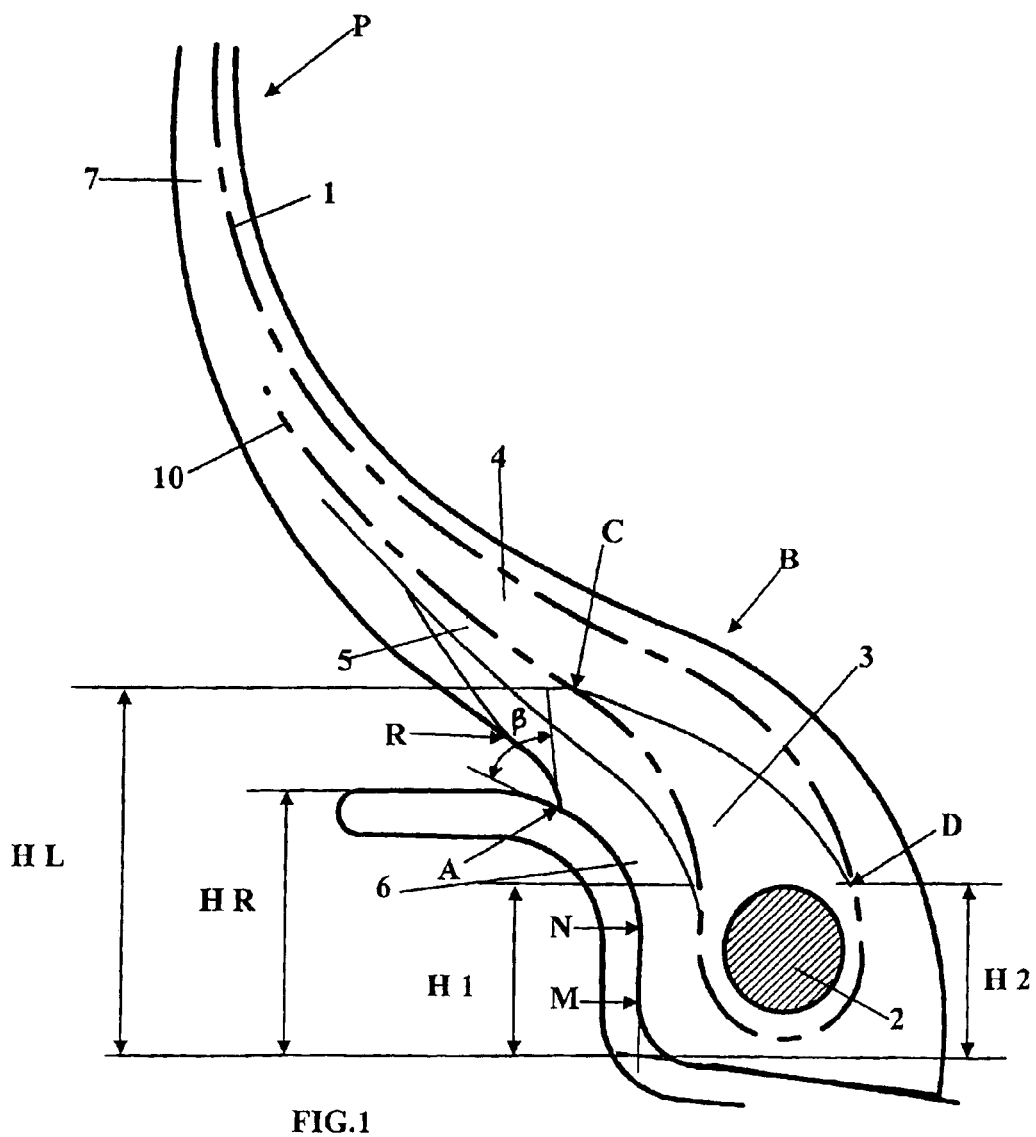

In a preferred embodiment shown in FIG. 1, the tire P, of size 12 00. R. 24, is intended to be mounted on an 8.50–24 rim, the seats of which are inclined relative to the axis of rotation of said rim by an angle of 5°. The tire comprises a tread (not shown) connected to two beads B (only one of which is shown) by means of two sidewalls 7 (only one of which is shown), and is reinforced on the one hand by a crown reinforcement (not shown) and on the other hand by a radial carcass reinforcement (1). The carcass reinforcement (1) is, in this example, formed of a single ply of metal cables, which are made of steel. The radial carcass reinforcement (1) is anchored within each bead (B) by winding around a bead wire (2), so forming an upturn (10). In one embodiment, the end the upturn is situated at a radial distance from the base of the bead that is substantially equal to 30% of the height of the tire (P). The base of the bead is understood to mean, when viewed in meridian section, the straight line parallel to the axis of rotation passing through the point of intersection of the generatrix of the bead seat and the straight line of the bead flange, said straight line being perpendicular to the axis of rotation.

Radially above the bead wire (2) and axially between the non-upturned portion of the carcass ply (1) and its upturn (10), there is disposed a first profile (3) of a rubber mix of a Shore A hardness of at least 85. In a more preferred embodiment, the Shore A hardness of the rubber mix is 97.

The first rubber mix profile may have a substantially triangular shape and a height HL, measured relative to the base of the bead and markedly greater than the height HR of the rim flange, and is attached at its radially upper end (C) to the upturn (10) and is thus in contact with said upturn over the entire extent of its height.

The end (C) is separated from the non-upturned carcass reinforcement main portion by a second profile (4) of rubber mix of a lower Shore A hardness. In one embodiment, the Shore A hardness of the second rubber mix (4) is at most 60. In another embodiment, the Shore A hardness of the second rubber mix (4) is 56. The shape of the second rubber mix profile (4) is such that its radially lower end D is situated at a radial distance H2 from the base of the bead, H2 being less than HR, and is situated in such a way that the axially inner face of the first rubber mix profile (3) is in contact, over a very shallow depth, with the non-upturned portion of the carcass ply 1.

The radially upper end of the second rubber mix profile 4 is situated radially above the end of the carcass ply upturn (10). The bead (B) is covered externally with a protective layer (6) or protector, of a very hard rubber mix, which protector ensures contact with the seats and flange of the operating rim.

The protector (6) is in contact with the upturn (10) of the carcass ply (1) over the height H1 so as then to be separated from the upturn by a third rubber mix profile (5) of low Shore A hardness. In one embodiment, the Shore A hardness of the third rubber mix profile is at most equal to 55, and in a more preferred embodiment, is equal to 47. In one embodiment, the third rubber mix profile (5) has a lenticular shape and extends radially over a height such that it covers the end of the upturn (10).

The meridian profile of the axially outer surface of the bead (B) and of the sidewall (7) consists of a straight segment MN perpendicular to the axis of rotation extended radially to the outside by a concave arc of a circle NA, the portion MA having to be in permanent contact with the rim flange. The point A is the point of abrupt discontinuity with the concave arc of a circle AR, which extends radially to the outside the arc NA. The arc AR does not come into contact with the rim flange. The arc AR forms a tangent radially to the outside with the convex arc of a circle of sidewall (7). At the point A, the tangents respectively to the arcs of circles NA and AR form between them an acute angle β equal to 40°.

Although the invention has been described and illustrated herein by reference to specific embodiments thereof, it will be understood that such embodiments are susceptible of variation and modification without departing from the inventive concepts disclosed. All such variations and modifications, therefore, are intended to be encompassed within the spirit and scope of the appended claims.

What is claimed is:

1. A tire intended to be mounted on a rim having at least one bead seat which forms an angle with the axis of rotation of between 0° and 60°, said tire comprising two beads, at least one bead wire within said beads and a radial carcass reinforcement having an upturn portion and a non-upturned main portion, said bead wire being radially surmounted, axially between the upturn portion and the non-upturned portion of the radial carcass reinforcement, said tire further comprising a first rubber mix profile substantially triangular in form and of an elevated Shore A hardness at least equal to 85 points, wherein the meridian profile of the axially outer surface of each bead comprising a first curved portion which is intended to enter into and remain in permanent contact with a bead flange, and which is in an abrupt discontinuity of curvature with a second curved portion, wherein tangents to the first and second curved portions, respectively, at the abrupt discontinuity form together an acute angle of at least 35° with the tire in an unmounted state, and wherein said meridian profile is combined with the presence of the first rubber mix profile of a height such that said meridian profile is axially in contact over its entire height with the upturn of the radial carcass reinforcement and is separated from the main portion of the radial carcass reinforcement by a second rubber mix profile having a low Shore A hardness at most equal to 60 points, and further comprising a third rubber mix profile disposed axially to the outside of the upturn of the radial carcass reinforcement between a protector, which covers the bead axially to the outside, and said upturn.

2. The tire according to claim 1 wherein the third rubber mix profile has a Shore A hardness lower than the Shore A hardness of the second rubber mix, and is at most equal to 55 points.

3. The tire according to claim 1 wherein both of the first and second curved portions are concavely curved.

* * * * *